(12) United States Patent
Tione et al.

(10) Patent No.: US 11,529,978 B2
(45) Date of Patent: Dec. 20, 2022

(54) SYSTEM AND METHOD FOR DETECTING AN ABNORMAL GAIT CONDITION OF A RAILWAY VEHICLE

(71) Applicant: FAIVELEY TRANSPORT ITALIA S.p.A., Piossasco (IT)

(72) Inventors: Roberto Tione, Lauriano (IT); Maurizio Mittino, Piossasco (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 538 days.

(21) Appl. No.: 16/611,896

(22) PCT Filed: May 9, 2018

(86) PCT No.: PCT/IB2018/053223
§ 371 (c)(1),
(2) Date: Nov. 8, 2019

(87) PCT Pub. No.: WO2018/207114
PCT Pub. Date: Nov. 15, 2018

(65) Prior Publication Data
US 2020/0290656 A1 Sep. 17, 2020

(30) Foreign Application Priority Data

May 9, 2017 (IT) .......................... 102017000050006

(51) Int. Cl.
*B61K 9/12* (2006.01)
*G01B 11/25* (2006.01)

(52) U.S. Cl.
CPC ............ *B61K 9/12* (2013.01); *G01B 11/2518* (2013.01)

(58) Field of Classification Search
CPC .... B61L 3/008; B61L 15/0081; B61L 25/021; B61L 27/04; B61L 27/70; B61L 27/57;
(Continued)

(56) References Cited

U.S. PATENT DOCUMENTS

| 9,211,879 B2 * | 12/2015 | Leitel ................... B60T 8/3235 |
| 2016/0046308 A1 * | 2/2016 | Chung ................... B61L 27/70 701/20 |

(Continued)

FOREIGN PATENT DOCUMENTS

| DE | 29901917 U1 | 7/1999 |
| DE | 10062602 A1 | 6/2002 |

(Continued)

OTHER PUBLICATIONS

International Search Report, issued in PCT/IB2018/053223, dated Sep. 21, 2018, Rijswijk, Netherlands.

*Primary Examiner* — Isiaka O Akanbi
(74) *Attorney, Agent, or Firm* — Christopher R. Carroll; The Small Patent Law Group LLC (57) ABSTRACT

A system is provided for detecting an abnormal gait condition of a railway vehicle, including a first control chain and a second control chain connected to a digital output adapted to supply or not supply power to a load. The first control chain comprises a first sensor for detecting first detection data of movement of the railway vehicle, and a first control unit for receiving the first detection data, executing a first program for checking an abnormal gait and for controlling first electronic control means for supplying or not supplying power to the load. The second control chain comprises a second sensor for detecting second detection data of movement of the railway vehicle, and a second control unit for receiving the second detection data, executing a second program for checking an abnormal gait, and for controlling second electronic control means for supplying or not supplying power to the load.

19 Claims, 7 Drawing Sheets

(58) Field of Classification Search
CPC ...... B61L 15/0027; G01P 21/00; B61F 99/00; B61F 9/005; G01M 17/08; B61K 9/12
USPC ................... 356/237.2–237.6, 72, 629, 632
See application file for complete search history.

(56) References Cited

U.S. PATENT DOCUMENTS

2016/0159381 A1* 6/2016 Fahmy ..................... B61K 9/10
 701/19
2016/0325767 A1* 11/2016 LeFebvre ............. G01M 17/10

FOREIGN PATENT DOCUMENTS

| | | | |
|---|---|---|---|
| EP | 1236633 A2 * | 9/2002 | .............. B61F 9/005 |
| EP | 1236633 A2 | 9/2002 | |
| EP | 2165912 A1 | 3/2010 | |
| EP | 2602168 A1 | 6/2013 | |
| KR | 20120014092 A | 2/2012 | |
| WO | 2004022406 A1 | 3/2004 | |
| WO | 2014048737 A1 | 4/2014 | |
| WO | 2014048768 A1 | 4/2014 | |

* cited by examiner

SYSTEM AND METHOD FOR DETECTING AN ABNORMAL GAIT CONDITION OF A RAILWAY VEHICLE

TECHNICAL SECTOR

The present invention is, in general, in the field of safety systems for a railway vehicle; in particular, the invention relates to a system and a method for detecting an abnormal gait condition of a railway vehicle.

The abnormal gait condition may consist of a derailment condition and/or an instability condition of a truck of a railway vehicle.

PRIOR ART

The derailment or instability of railway vehicles is generally caused by four categories of undesirable events:
- damage to mechanical components of the train, for example wheels, suspension, axles, and bearings;
- damage to mechanical components of the railway line, such as increasing the distance between the inner sides of the head of the two rails of a track, and an inclination or breakage of the rail;
- structural geometric defects of the wheels or rails; and
- unpredictable external causes, such as the presence of foreign objects on the line.

Derailment is a frequent event that has serious consequences and is a very complex phenomenon from the physical point of view.

Systems for detecting derailment are known which allow the risks of derailment to be simultaneously analyzed based on one or at most two parameters.

For example, WILD sensors ("Wheel impact load detectors") are strain gauges or load cells that allow the vertical load that is transferred from the wheels to the rail to be measured. In this way the presence of defects on the wheel, such as an insufficiently circular shape, the presence of flat surfaces or other tread defects that generate abnormal loads on the rail and which may initiate a derailment may be evaluated.

Other systems measure lateral forces and provide a yaw index of the axles and concurrently measure vertical forces to determine a risk of derailment due to flange hopping.

Systems are also known which are limited to trying to limit the consequences of a derailment. Such systems activate only the emergency braking system after the derailment occurs. However, these systems are not able to predict the occurrence of derailment.

For example, R20120014092 describes a system based on sensors that measure the distance between the rail and the vehicle. In this system, a signal is provided only when one or more wheels have left their normal operating position. Which is to say, when the derailment has already happened.

In other known systems, to detect derailment conditions, each vehicle is equipped with a monitoring device capable of detecting accelerometer and gyroscope signals. Consequently, for the signals, comparison rules, algorithms and tables are established to detect the moment when the travel conditions turn from a normal travel condition to an abnormal condition, which may coincide with a derailment.

For safety reasons, it is necessary to ensure that such systems have redundant structures that allow the system to function properly even if one of the electronic components malfunctions.

For example, in EP2165912 a device for monitoring the instability of a railway vehicle is described. Such device comprises a first accelerometer which provides an acceleration signal in response to the vibrations along a reference axis, a solid-state relay switchable between a closed condition and an open condition, and a programmable logic device, FPGA, connected to the accelerometer and to the solid-state relay. The programmable logic device includes non-volatile logic blocks for the simultaneous parallel execution of an instability monitoring algorithm to change the state of the relay based on a condition of instability of the acceleration signal.

The use of a single FPGA component does not guarantee the necessary hardware and software redundancy of the system. Even if non-volatile logic blocks are used for simultaneous parallel execution of a monitoring algorithm, in the presence of damage to the FPGA, the detection system would not be able to perform its task properly.

SUMMARY OF THE INVENTION

An object of the present invention is therefore to provide a system and a method for detecting an abnormal gait condition of a truck of a railway vehicle which have a high degree of redundancy and reliability.

The aforesaid and other objects and advantages are achieved, according to an aspect of the invention, by a system and a method for detecting an abnormal gait condition of a truck of a railway vehicle having the features defined in the independent claims. Preferential embodiments of the invention are defined in the dependent claims.

BRIEF DESCRIPTION OF THE FIGURES

The functional and structural features of some preferred embodiments of a system for detecting an abnormal gait condition of a truck of a railway vehicle according to the invention will now be described. Reference is made to the accompanying drawings, wherein.

DETAILED DESCRIPTION

Before explaining a plurality of embodiments of the invention in detail, it should be clarified that the invention is not limited in its application to the details of construction and to the configuration of the components provided in the following description or illustrated in the drawings. The invention may assume other embodiments and may be implemented or achieved in essentially different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

The system for detecting an abnormal gait condition of a truck of a railway vehicle 1 according to the invention includes a first control chain C1 and a second control chain C2. The control chains C1 and C2 are connected to a digital output O to which a load L is connected.

The digital output O is adapted to supply, or not to supply, the power needed to activate the load L. The power is supplied, or not supplied, to the load L according to the detection of an abnormal gait condition of the railway vehicle. In the configurations shown in FIGS. 3 to 5, power is not supplied to the load when a condition of potential abnormal gait of the railway vehicle is detected.

The first control chain C1 comprises first sensor means SI adapted to detect first detection data of the attitude and/or movement of the railway vehicle, and a first control unit U1 adapted to receive said first detection data of the attitude and/or of the movement of the railway vehicle from the first sensor means S1, executing a first computer program SW1 for checking an abnormal gait condition of the railway vehicle and controlling the first electronic control means E1 to supply or not to supply power to the load L.

The second control chain C2 comprises second sensor means S2 adapted to detect second detection data of the attitude and/or movement of the railway vehicle, and a second control unit U2 adapted to receive said second detection data of the attitude and/or of the movement of the railway vehicle from the second sensor means S2, executing a second computer program SW2 for checking an abnormal gait condition and second electronic control means E2 to supply or not to supply power to the load L.

The second sensor means S2 are different from said first sensor means S1, said second control unit U2 is different from said first control unit U1, said second computer program SW2 for checking an abnormal gait is different from said first computer program SW1 for checking an abnormal gait and the second electronic control means E2 are different from the first electronic control means E1.

Clearly, the first computer program SW1 will be able to exploit the first detection data received by the first sensor means S1 and the second computer program SW2 will be able to exploit the second detection data received from the second sensor means S2 to detect an abnormal gait condition.

Figure 3:
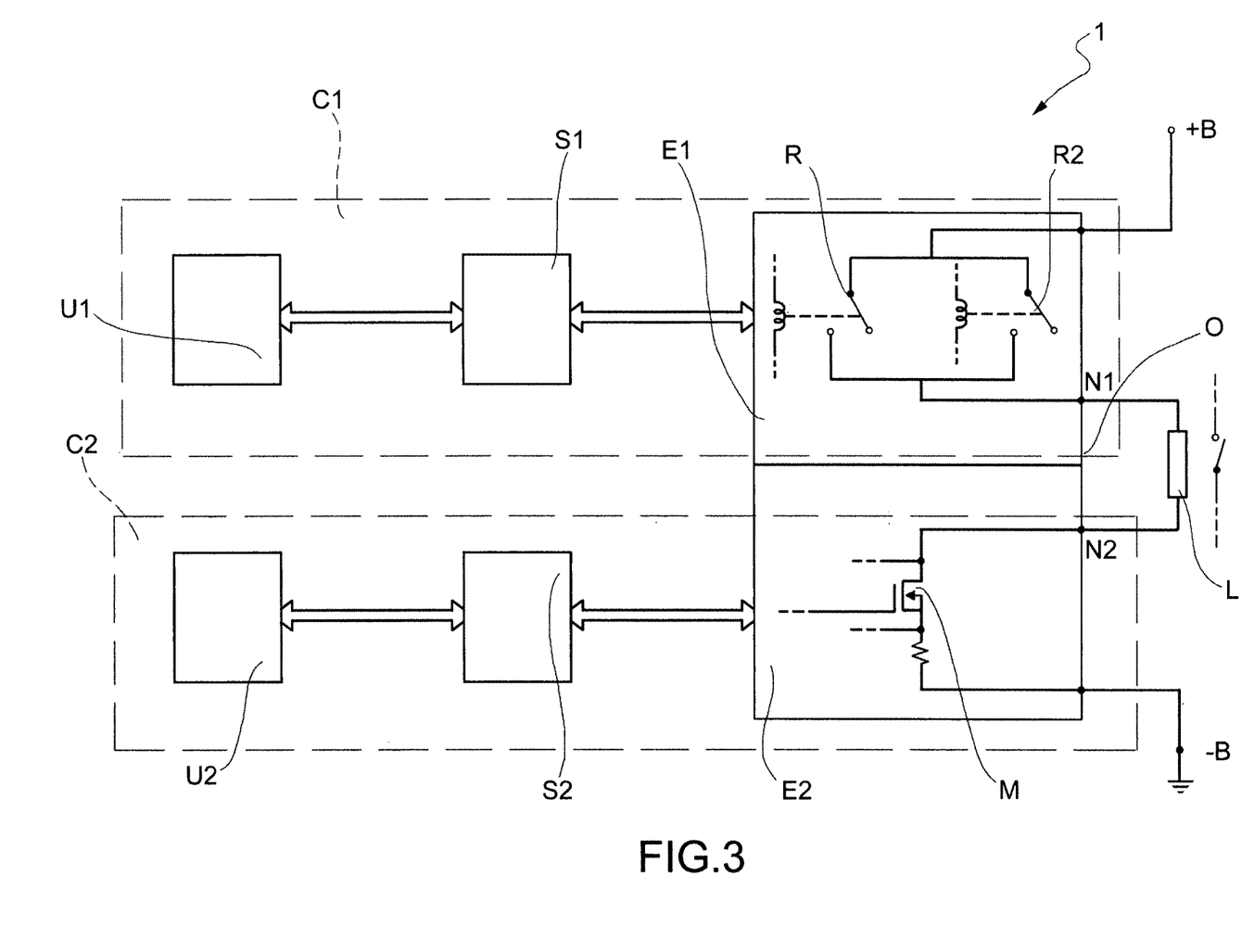
FIG. 3 illustrates the system for detecting an abnormal gait condition of a truck of a railway vehicle in the case wherein the load is disposed between a first node of the first electronic control means and a first node of the second electronic control means.

With reference to FIG. 3, an embodiment of the system for detecting an abnormal gait condition of a truck of a railway vehicle is illustrated, wherein the first electronic control means E1 and the second electronic control means E2 are connected in series and with the load L between two reference potentials B−, B+. In particular, the load L is disposed between a first node N1 of the first electronic control means E1 and a first node N2 of the second electronic control means E2.

Figure 4:
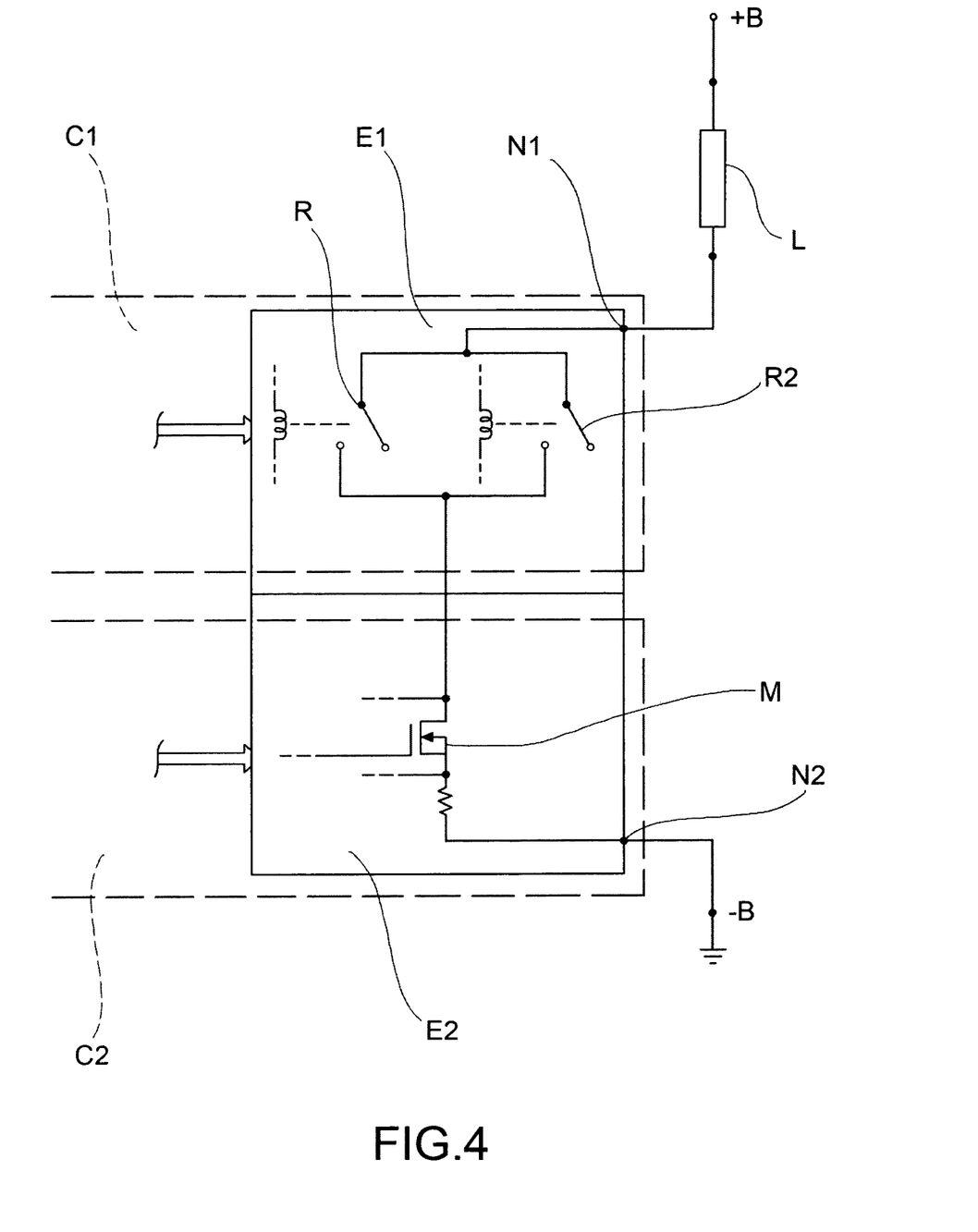
FIG. 4 illustrates the system and method for detecting an abnormal gait condition of a truck of a railway vehicle in the case wherein the load is disposed between a first node of the first electronic control means and a first reference potential.

FIG. 4 shows a further embodiment of the system for detecting an abnormal gait condition of a truck of a railway vehicle 1, wherein the load L is disposed between a first node N1 of the first electronic control means E1 and a first reference potential B+, or, in an embodiment not shown, between a first node N2 of the second electronic control means E2 and a second reference potential B−.

Preferably, the first and second electronic control means E1, E2 are in a normally open condition and are brought into a closed condition when the power is supplied to the system by the detection of an abnormal gait condition of a truck of a railway vehicle 1.

In this way, if even one of the first and second electronic control means E1, E2, or any component of the first or second control chain U1, U2, does not work properly due to damage, the detection system of an abnormal gait condition of a truck of a railway vehicle 1 enters into a safety condition wherein an alarm is generated. Moreover, even only one of the two control chains U1, U2 detecting an abnormal gait condition of a truck of a railway vehicle is sufficient to stop the supply of power to the load L through the first or second electronic control means E1, E2. These embodiments allow the maximum probability of intervention in the event of an abnormal gait of a truck of the railway vehicle.

By way of example, the load L connected to the digital output O is a means capable of transferring the detection of an abnormal gait of the truck to a detection and signaling device located inside the cabin of the railway vehicle, which serves to warn an operator of the railway vehicle RV visually and/or or acoustically of the occurrence of an abnormal gait condition of a truck of a railway vehicle.

The load L may also be a control system capable of acting directly on the brake system of the railway vehicle. For example, the load L may be a discharge valve connected to the brake pipe of a railway vehicle. Such valve is therefore the load L controlled by the system for detecting an abnormal gait condition.

By means of such valve, controlled pressure reliefs may be executed in the brake pipe, in particular, controlled sequences capable of being decoded by the signaling device in the operator's cab of the locomotive.

For example, the detection and signaling device located inside the operator's cab may:
1) apply emergency braking by continuously powering the load L;
2) request an engine driver to reduce the speed by activating the load L with a predefined discharge sequence; for example, a discharge sequence of two discharges lasting 3 seconds separated by a 2-second pause. If the device does not detect the speed decrease within a predetermined period of time, emergency braking may start automatically (see point 1);
3) request the engine driver to stop the train as soon as possible with, for example, a discharge sequence of 3 discharges lasting 3 seconds separated by a 2-second pause. If the device does not detect the stopping of the train within a predetermined period of time, emergency braking may start automatically (see point 1).

Figure 5:
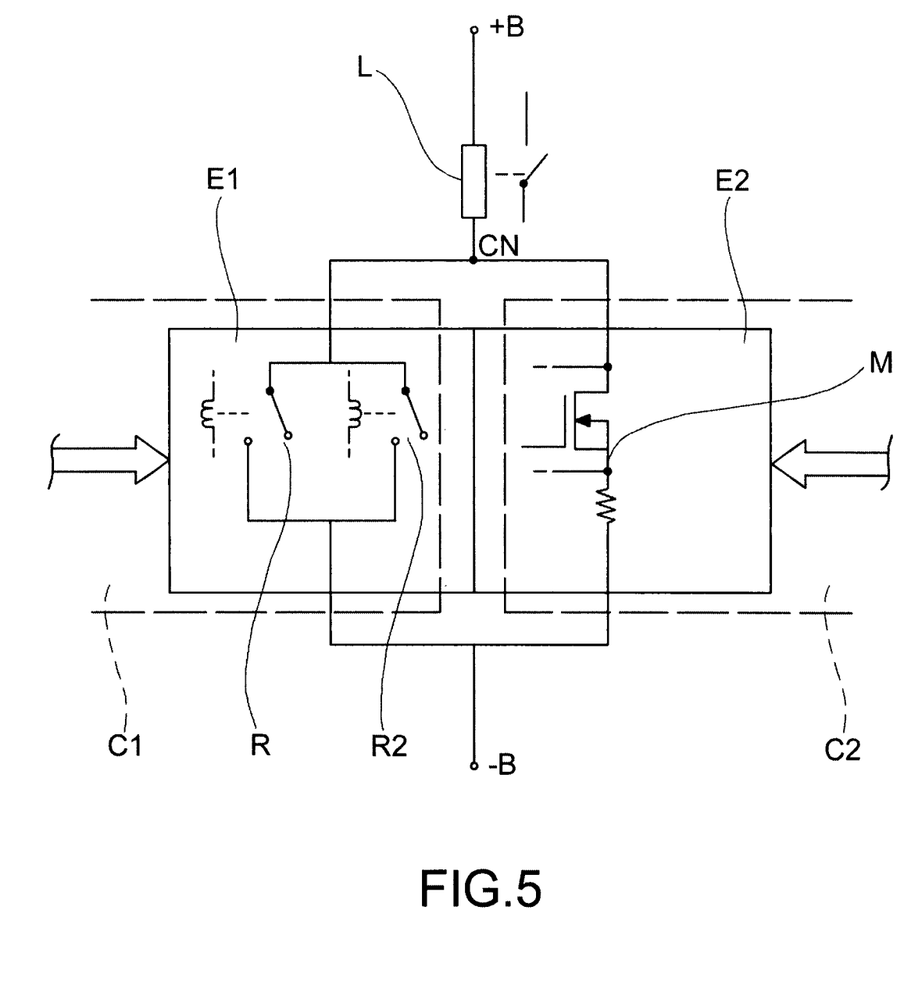
FIG. 5 illustrates the system for detecting an abnormal gait condition of a truck of a railway vehicle in the case wherein the load is disposed between a first reference potential and a first common node between the first electronic control means and the second electronic control means.

FIG. 5 illustrates a further embodiment of the system for detecting an abnormal gait condition of a truck of a railway vehicle in the case wherein the load L is disposed between a first reference potential B+ and a first common node CN between the first electronic control means E1 and the second electronic control means E2. Consequently, the first electronic control means E1 and the second electronic control means E2 are disposed parallel to each other.

Preferably, the first and second electronic control means E1, E2 are in a normally open condition and are brought into a closed condition when the power is supplied to the system for detecting an abnormal gait condition of a truck of a railway vehicle 1. Therefore, if a single fault concerns a component of only one of the first and second control chains U1, U2 of the system for the detection of an abnormal gait condition of a truck of a railway vehicle, the alarm is not generated.

Unlike what has been said for the preceding embodiments, in this case, it is necessary, for both of the two control chains U1, U2 to detect an abnormal gait condition of a truck of the railway vehicle to stop powering the load L through the first or second electronic control means E1, E2 and effectively send an alarm signal. This embodiment makes it possible to maximize availability of the train by limiting false detections.

In a currently preferred embodiment, the sensor means S1, S2 may both be at least one accelerometric sensor and a gyroscopic sensor.

By way of example, the first control unit U1 and the second control unit U2 each include a "different" microprocessor from each other. In the present description the term "different" indicates the fact that two different components are not only two distinct elements, but also have different structural features.

For example, said different microprocessors are microprocessors having internal structures different from each other and/or that use different technologies, and said computer programs SW1, SW2 have different codes. In this way, the occurrence of a hardware or software malfunction of both control units U1 and U2, due to the same design and/or manufacturing defect, is excluded.

To obtain complete and independent hardware redundancy between the two control chains C1 and C2, as may be seen in FIGS. 3 and 4. the first electronic control units E1 comprise at least one relay device R and the second electronic control units E2 include at least one MOS device M, or vice versa.

To avoid overheating of the relay device R due to a prolonged operating period in which it is supplied with power, a second relay device R2 may be provided. The two relay devices R, R2 may be used alternately to reduce the overheating. In any case, for the purpose of signaling an abnormal gait condition, it is sufficient to use only one relay device R.

In other embodiments not illustrated, different types of electronic control units may also be used, for example safety relays, acoustic devices (sirens), communication networks, etc.

In one embodiment of the system for detecting an abnormal gait condition of a railway vehicle 1, the abnormal gait condition is a condition of derailment of the railway vehicle 1.

In a further alternative embodiment, the abnormal gait condition is a condition of instability of the railway vehicle.

In a further third alternative embodiment, the abnormal gait condition may be either a derailment condition or an instability condition of the railway vehicle. In this third alternative embodiment, the system for detecting an abnormal gait condition of a railway vehicle 1, by means of the first computer program SW1, the second computer program SW2 and the data detected by the first and second sensor means S1, S2, may detect and distinguish between a derailment condition and an instability condition and generate respective alarm signals.

For example, in the event of detection of a derailment condition, the load L may be continuously de-energized and, in the event of detection of an instability condition, the load L may be de-energized in a non-continuous way, with a predetermined signaling frequency. Alternatively, the system for detecting a derailment may further comprise a CAN network for sending or receiving system signals for detecting an instability condition, and, in the event of detection of a derailment condition, the load L may be de-energized continuously.

In this way. a respective instability alarm signal may be sent via said CAN network for signaling to an operator, regardless of the load L.

Figure 8:
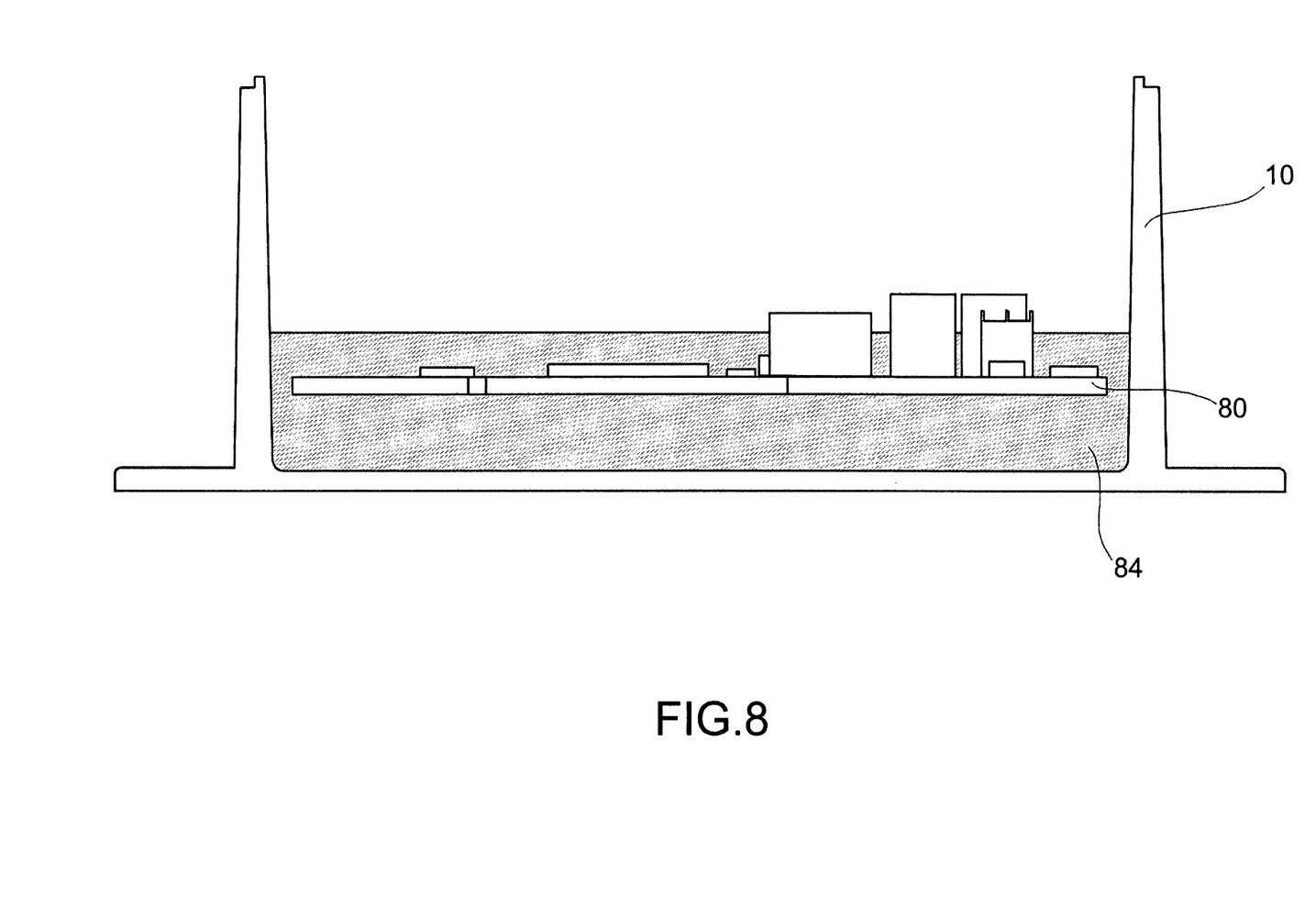
FIG. 8 is a sectional view of the system for detecting an abnormal gait condition of a truck of a railway vehicle, wherein the enclosure contains therein a resin in which the electronic board of the system is immersed.

As illustrated in FIG. 8, the first control chain C1 and the second control chain C2 are installed on at least one electronic board 80.

The at least one electronic board 80 is contained in an enclosure 10. The enclosure may be made of metal or plastic material.

An end 12 of a cable 14 is firmly coupled to the enclosure 10. The cable is used to send or receive system signals for the derailment detection 1.

A connector 18 is installed to a second end 16 of the cable 14, to which, for example, a corresponding connector of a cable connected to the load L may be connected.

The cable 14 is preferably used for supplying power to the system and for transporting the signals of the system's CAN network, which may be used for communications from and supplied by the system for detecting abnormal gait 1.

Figure 1:
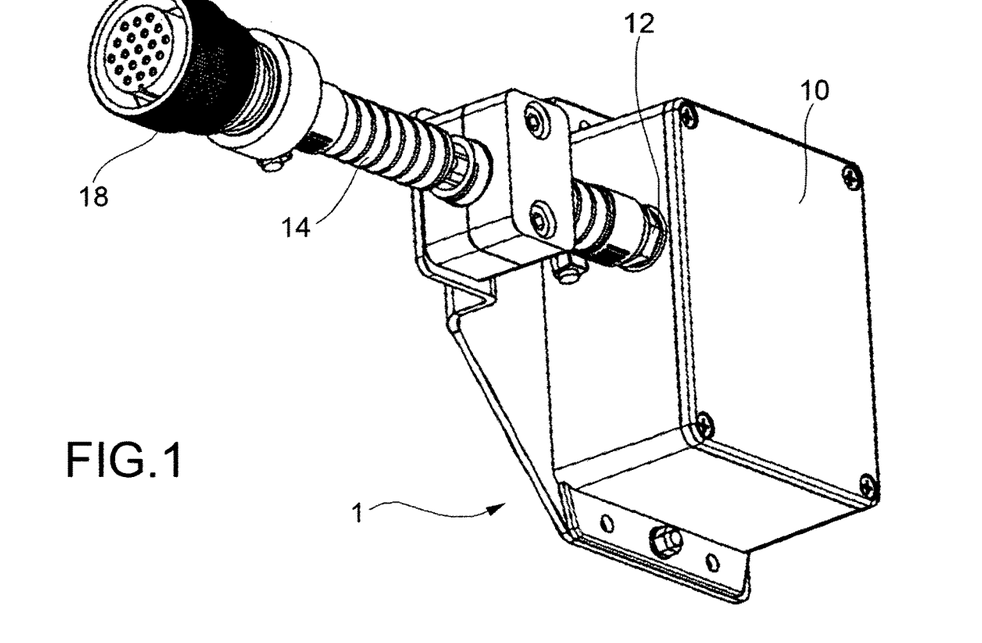
FIG. 1 is a perspective view of the system for detecting an abnormal gait condition of a truck of a railway vehicle.
Figure 2:
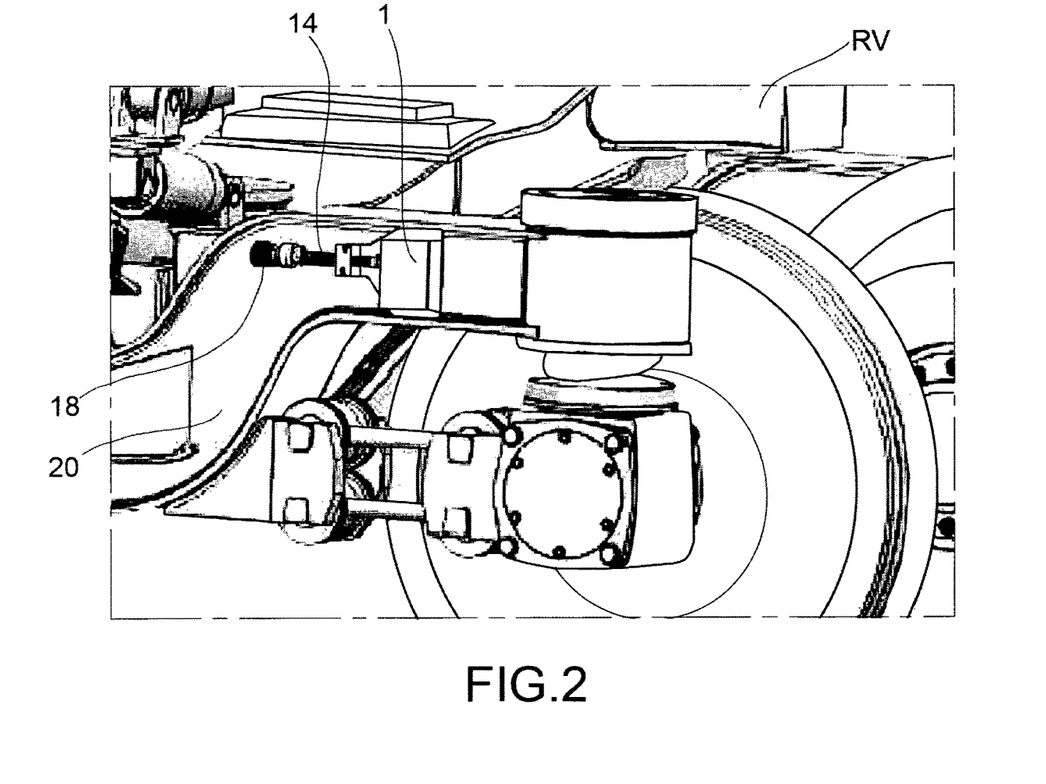
FIG. 2 illustrates the system for detecting an abnormal gait condition of a truck of a railway vehicle when installed on a frame of a truck of the railway vehicle.

The system for detecting an abnormal gait condition of a railway vehicle 1 is installed preferably, but not necessarily, on a frame of a truck 20 of the railway vehicle.

The enclosure 10 further comprises a cover 20 which may be removed to access the circuitry of the system for detecting an abnormal gait condition of a railway vehicle 1 for maintenance or installation purposes.

To eliminate the high frequency components which are of no interest to the dynamics of the railway truck but which influence the instantaneous values acquired by the sensor means S1, S2, the system for detecting an abnormal gait condition of a railway vehicle may comprise at least one low-pass filter.

The enclosure 10 may contain therein a resin 84 in which the at least one electronic board 80 is immersed.

Such resin acts as a low-pass filter within the system.

The at least one electronic board 80 is in no way fixed to the enclosure 10 to avoid transmitting the vibrations to which the enclosure 10 is subjected with a frequency higher than those of interest to the electronic board 80. In this way, the values acquired by the first and second sensor means S1, S2 will not be negatively affected by such vibrations.

To obtain this type of installation, a dedicated frame is used to hold the electronic part in position during the casting of the resin 84, and subsequently the resin is cast into the enclosure 10 until the electronic board 80 is covered to the desired level.

Finally, the frame is removed after the resin 84 has hardened and a floating encapsulation is thus obtained.

The electronic part will therefore not be rigidly fixed to any mechanical part.

The resin must be selected for the appropriate hardness for the application to dampen the frequencies not of interest and avoid low frequency resonances.

The floating encapsulation guarantees shock and vibration protection; in effect, the resin mechanically isolates the electronic part from the mechanical part on which it will be installed and acts as a damper for vibrations and shocks.

Being able to filter high frequency vibrations, the resin allows the use of less expensive accelerometers, such as MEMS accelerometric sensors. Less expensive accelerometers do not allow filters to be added to limit the band between the sensing element and the analogue digital conversion part. In the absence of resin, the use of such components is limited to environments not subject to vibrations in relatively high frequencies due to the problems of aliasing and saturation of the sensitive part.

The resin also allows lower sampling frequencies to be used; in effect, the frequency to be used is at least twice the maximum frequency of the measured signal.

In this way, the first sensor means S1 or the second sensor means S2, in a further embodiment of the system, may comprise at least one MEMS accelerometric sensor.

The concepts described herein concerning the resin and the floating encapsulation may be applied to any detection system and not only to the system for detecting an abnormal gait condition of a railway vehicle having the features described above.

The invention further comprises a method for detecting an abnormal gait condition of a railway vehicle.

The method for detecting an abnormal gait condition of a railway vehicle comprises the steps of acquiring first detection data of the attitude and/or movement of the railway vehicle by means of first sensor means S1 of a first control chain C1, transmitting the first detection data from the first sensor means S1 to a first control unit U1 of the first control chain C1, executing the first computer program SW1 for checking an abnormal gait of the railway vehicle in the first control unit U1 of the first control chain C1, and controlling, by means of the first control unit U1, the first electronic control means E1 of the first control chain C1, as a function of the decisions of the first computer program SW1 for checking an abnormal gait of the railway vehicle, to supply or not supply power to a load L.

The method further comprises the steps of acquiring second detection data of the attitude and/or movement of the railway vehicle by means of second sensor means S2 of a second control chain C2, different from said first sensor means S1, transmitting the second detection data from the second sensor means S2 to a second control unit U2 of the second control chain C2, different from said first control unit U1, executing the second computer program SW2 for checking the abnormal gait of the railway vehicle, different from said first computer program SW1 for checking an abnormal gait of the railway vehicle, in the second control unit U2 of the second control chain C2, and controlling, by means of the second control unit U2, second electronic control means E2 of the second control chain C2, different from said first electronic control means E1, according to the decisions of the second computer program SW2 for checking an abnormal gait of the railway vehicle, to supply or not supply power to the load L.

Figure 6:
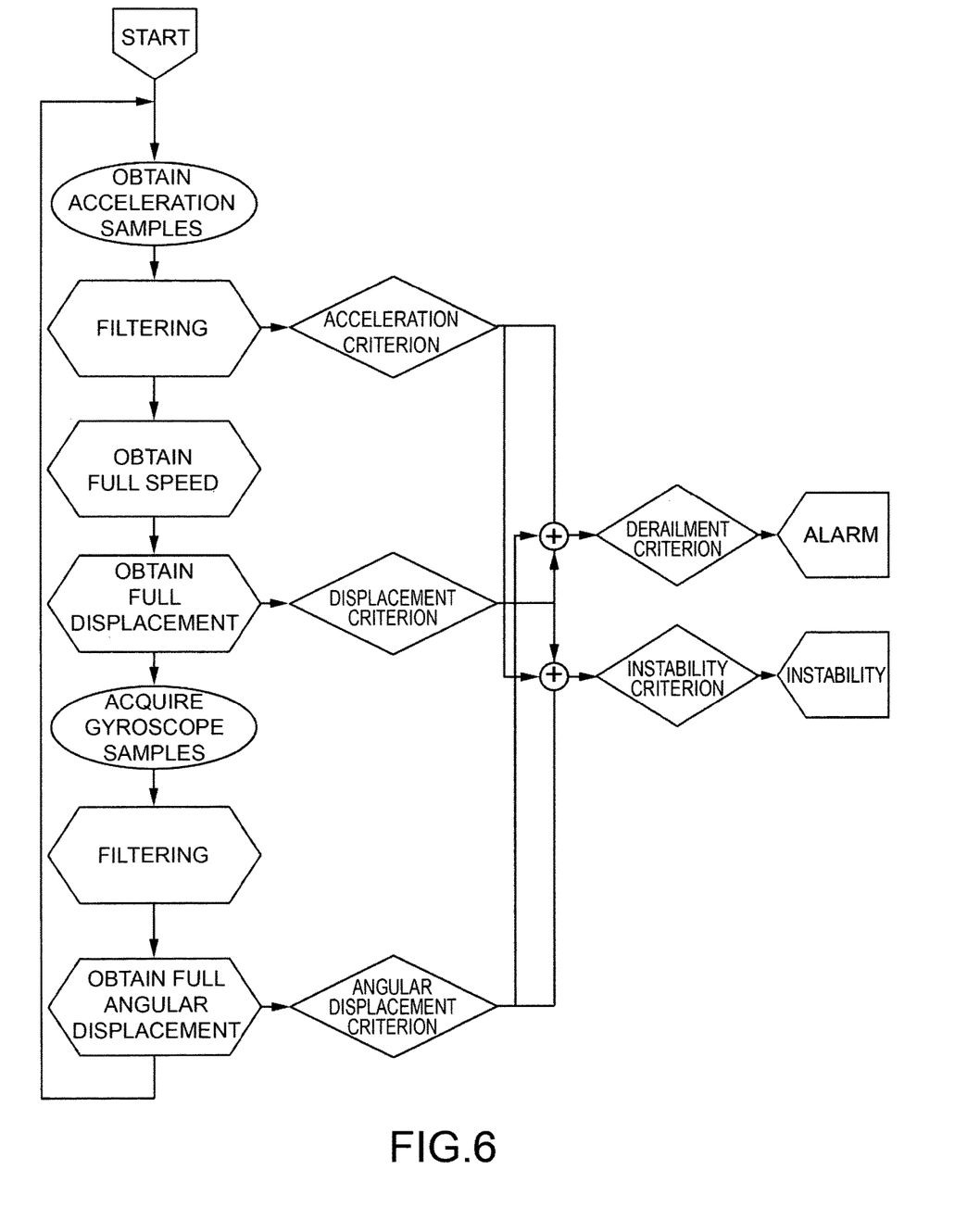
FIG. 6 is a block diagram of the algorithm implemented in the first computer program SW 1 based on criteria in the time domain.

With reference to FIG. 6, the program SW1 acquires the data measured by the first sensor means S1, respectively the data measured by a first accelerometric sensor and a second gyroscopic sensor. Such data are acquired at a suitable frequency (for example 2000 Hz), obtaining the instantaneous acceleration values in the three axes x, y, z of the truck and the angular velocity of a wheel.

Where x coincides with the axis longitudinal to the rail, y coincides with the axis transverse to the rail, and z coincides with the vertical axis with respect to the rail.

Figure 7:
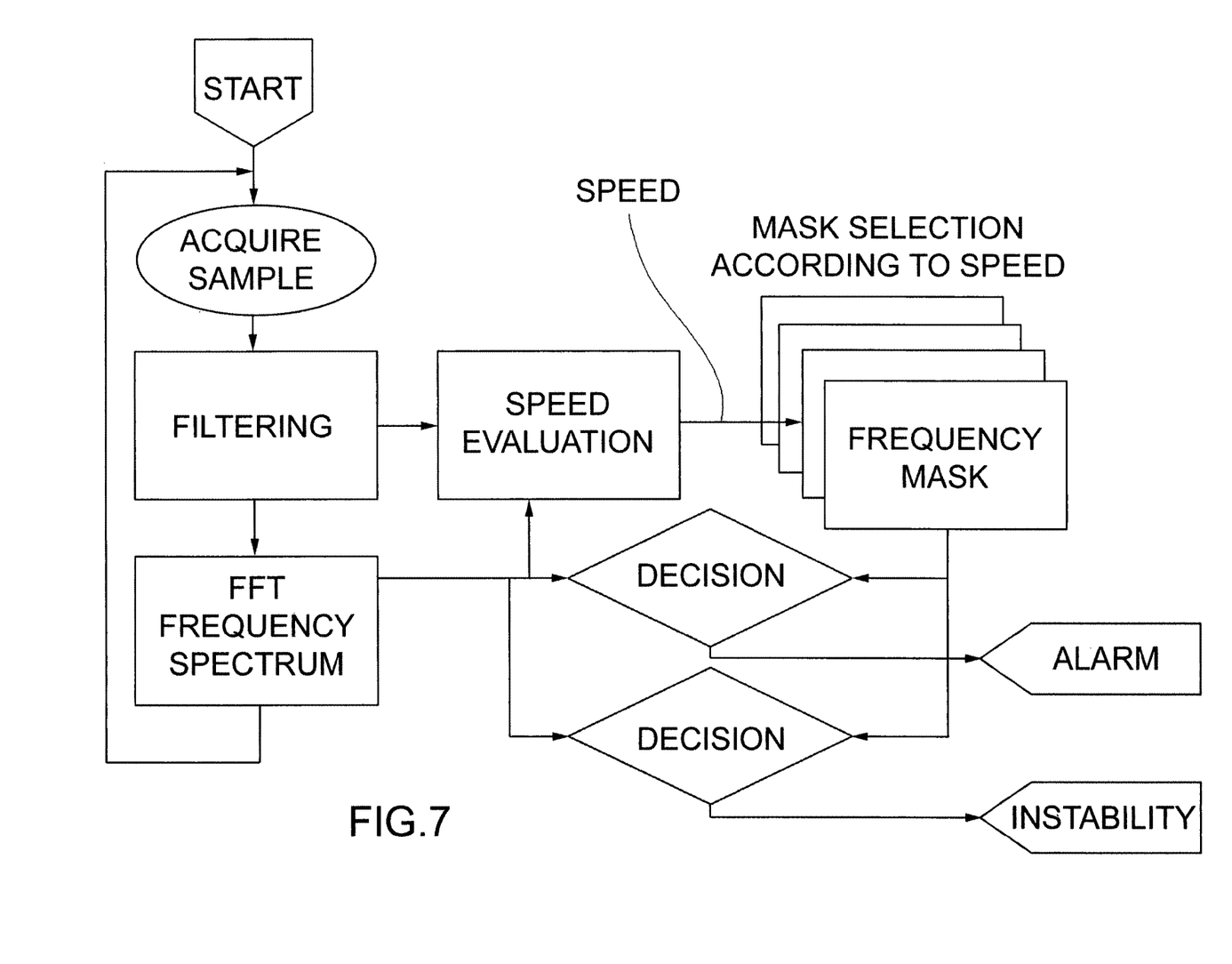
FIG. 7 is a block diagram of the algorithm implemented in the second computer program SW2 based on criteria in the frequency domain.

In this embodiment of the method, the first and the second computer program for checking a derailment SW1, SW2 may exploit different detection criteria, for example, SW1 exploits detection criteria in the time domain and SW2 exploits detection criteria in the frequency domain.

In the scope of detection in the time domain, in addition to pure analysis of the received signal against amplitude or frequency limits, an analysis of the truck's position in space may be carried out, obtaining the instantaneous position of the truck through successive integrations in time of linear and angular accelerations relative to the three axes. Such integrations must be performed within a moving time window of limited duration to avoid drift of the integrators. Such integrations will provide information relating to possible jumps of vertical position or sudden rotation of the truck, indicating a derailment even at very low speeds, where the vertical accelerations may not give immediate information on a derailment that has occurred.

Purely by way of non-limiting example, hereinafter an illustrative embodiment of the method for detecting an abnormal gait condition of a railway vehicle is provided. In such illustrative embodiment, the detection of an abnormal gait condition of a railway vehicle bases the detection of an abnormal gait condition of a truck of the railway vehicle, in particular of the instability and/or derailment of the truck, on three criteria:

1) Acceleration level: high acceleration levels identify a possible impact of the truck with the ballast, a consequence of a possible derailment; lower values, but in any case outside those expected for normal operation, identify possible damage to the mechanics of the truck, wheels, bearings, etc.
2) Linear displacement: the rails do not allow high transient linear displacements, whereby a sudden movement of more than a few centimeters, on any axis, indicates a—possible derailment; the frequent presence of transient movements of a few centimeters on the longitudinal and transverse axis indicate an instability of the truck.
3) Angular displacement: in the same way as the linear displacement, the rails do not allow high transient angular displacements, whereby a sudden movement of more than a few degrees on any axis indicates a possible derailment; periodic transient movements of a few degrees on the longitudinal and transverse axis, on the other hand, indicate an instability of the truck.

Detection of the derailment and/or truck instability may combine the three criteria set out above. Each criterion contributes with different weights to detection. For example, if a predetermined threshold is exceeded, a derailment alarm signal is generated; if, on the other hand, a second predetermined lower threshold than said first threshold is surpassed, an instability signal is generated.

For example, in the frequency domain, comparison frequency masks may be used to detect abnormal gait conditions.

In this way, it is possible to obtain a detection having a greater accuracy than systems that use only vertical acceleration data, which are affected by the problem of generating false signaling when calibrated too sensitively, or of losing a correct signal when calibrated in a less sensitive way.

Various aspects and embodiments of a system and of a method for detecting a derailment of a truck for a railway vehicle according to the invention have been described. It is understood that each embodiment may be combined with any other embodiment. The invention, moreover, is not limited to the described embodiments, but may vary within the scope defined by the accompanying claims.

The invention claimed is:

1. A system for detecting an abnormal gait condition of a railway vehicle, including a first control chain and a second control chain connected to a digital output arranged to supply or not supply power to a discharge valve of a brake pipe depending on the detection of an abnormal gait condition of the railway vehicle;
the first control chain comprising:
a first sensor arranged to detect first detection data of an attitude of the rail vehicle; and
a first control unit arranged to receive the first detection data of the attitude of the rail vehicle from the first sensor, to execute a first computer program for checking an abnormal gait and to control a first electronic control device for supplying or not supplying the power to the discharge valve;
and the second control chain comprising:
a second sensor arranged to detect second detection data of the attitude of the rail vehicle; and
a second control unit arranged to receive the second detection data of the attitude of the rail vehicle from the second sensor, to execute a second computer program for checking the abnormal gait and to control a second electronic control device for supplying or not supplying the power to the discharge valve;
the second sensor being different from the first sensor, the second control unit being different from the first control unit, the second computer program being different from the first computer program and the second electronic control device being different from the first electronic control device.

2. The system for detecting the abnormal gait condition of the railway vehicle according to claim 1, wherein the abnormal gait condition is a derailment condition of the railway vehicle.

3. The system for detecting the abnormal gait condition of the railway vehicle according to claim 1, wherein the abnormal gait condition is an instability condition of the railway vehicle.

4. The system for detecting the abnormal gait condition of the railway vehicle according to claim 1, further comprising a CAN network for sending or receiving signals of the system for detecting the abnormal gait condition of the railway vehicle; the first and the second computer program being able to determine a condition of instability and generate a respective alarm signal to be sent via the CAN network.

5. The system for detecting the abnormal gait condition of the railway vehicle according to claim 1, wherein the discharge valve is disposed between a first node of the first electronic control device and a first node of the second electronic control device.

6. The system for detecting the abnormal gait condition of the railway vehicle according to claim 1, wherein the discharge valve is disposed between a first node of the first electronic control device and a first reference potential or between a first node of the second electronic control device and a second reference potential.

7. The system for detecting the abnormal gait condition of the railway vehicle according to claim 1, wherein the discharge valve is disposed between a first reference potential and a first common node of the first electronic control device and of the second electronic control device.

8. The system for detecting the abnormal gait condition of the railway vehicle according to claim 1, wherein each of the first sensor and the second sensor includes at least a gyroscopic sensor and an accelerometric sensor.

9. The system for detecting the abnormal gait condition of the railway vehicle according to claim 1, wherein each of the first control unit and the second control unit includes at least one microprocessor different between the first control unit and the second control unit.

10. The system for detecting the abnormal gait condition of the railway vehicle according to claim 1, wherein the first control unit comprises at least one relay device and the second control unit comprises at least one MOS device.

11. The system for detecting the abnormal gait condition of the railway vehicle according to claim 1, wherein the first control chain and the second control chain are installed on at least one electronic board contained in an enclosure.

12. The system for detecting the abnormal gait condition of the railway vehicle according to claim 11, wherein the enclosure contains a resin arranged to perform a low-pass filter function and in which the at least one electronic board is immersed; the at least one electronic board not being in any way fixed to the enclosure.

13. The system for detecting the abnormal gait condition of the railway vehicle according to claim 1, wherein the system for detecting the abnormal gait condition of the railway vehicle is installed on a frame of a truck of the railway vehicle.

14. A method for detecting an abnormal gait condition of a railway vehicle, the method comprising:
acquiring first detection data of one or more of an attitude or a movement of the railway vehicle using a first sensor of a first control chain;
communicating the first detection data from the first sensor to a first control unit of the first control chain;
executing a first computer program for checking the abnormal gait condition of the railway vehicle in a first control unit of the first control chain;
controlling, by the first control unit, a first electronic control device of the first control chain as a function of decisions of the first computer program for checking the abnormal gait condition of the railway vehicle, for supplying or not supplying power to a discharge valve of a brake pipe;
acquiring second detection data of the one or more of the attitude or the movement of the railway vehicle using a second sensor of a second control chain, the second sensor different from the first sensor;
communicating the second detection data from the second sensor to a second control unit of the second control chain, the second control chain different from the first control unit;
executing a second computer program for checking the abnormal gait condition of the railway vehicle, the second computer program different from the first computer program for checking the abnormal gait condition of the railway vehicle, the second computer program executed in the second control unit of the second control chain; and
controlling, by the second control unit, a second electronic control device of the second control chain, the second electronic control device different from the first electronic control device, the second electronic control device controlled as a function of decisions of the second computer program for checking the abnormal gait condition of the rail vehicle, for supplying or not supplying the power to the discharge valve.

15. The method for detecting the abnormal gait condition of the railway vehicle according to claim 14, wherein the first computer program and the second computer program for checking the abnormal gait condition of the rail vehicle use, respectively, a time domain detection criteria and a frequency domain detection criteria.

16. A system comprising:
different first and second sensors each configured to detect one or more of an attitude or movement of a vehicle;
a first control device configured to detect an abnormal gait of vehicle based on output of the first sensor indicative of the one or more of the attitude or the movement of the vehicle; and
a second control device that is different from the first control device and that is configured to detect the abnormal gait of the vehicle based on output of the second sensor indicative of the one or more of the attitude or the movement of the vehicle,
each of the first control device and the second control device configured to control supply of current to a discharge valve of a brake pipe in the vehicle based on the abnormal gait of the vehicle being detected.

17. The system of claim 16, wherein the first control device is configured to detect the abnormal gait of the vehicle using a time domain analysis of the output of the first sensor and the second control device is configured to detect the abnormal gait of the vehicle using a frequency domain analysis of the output of the second sensor.

18. The system of claim 16, further comprising an enclosure in which the first control device and the second control device are disposed, the enclosure including a resin in which the first control device and the second control device are immersed, the resin configured to provide a low-pass filter to the first control device and the second control device.

19. The system of claim 18, wherein the first control device and the second control device are immersed in the resin in the enclosure such that neither the first control device nor the second control device directly contacts the enclosure.

* * * * *